United States Patent [19]

Fowler

[11] 4,005,726
[45] Feb. 1, 1977

[54] THERMOMAGNETIC VALVE

[76] Inventor: Herbert H. Fowler, Box 11431, Lexington, Ky. 40511

[22] Filed: June 24, 1975

[21] Appl. No.: 589,842

[52] U.S. Cl. .............................. 137/119; 236/48 A; 236/74 R; 335/146; 335/208; 137/65; 137/624.14; 137/468; 137/609; 137/513
[51] Int. Cl.² ........................................ G05D 11/00
[58] Field of Search ............. 137/65, 66, 119, 468, 137/624.13, 513, 624.14, 607, 609; 236/1 F, 74, 48 A; 235/201 ME; 335/146, 208

[56] References Cited
UNITED STATES PATENTS

| 1,056,518 | 3/1913 | Edland | 137/513 |
|---|---|---|---|
| 1,952,516 | 3/1934 | Sperry et al. | 137/119 |
| 2,233,659 | 3/1941 | Wittmann | 137/65 |
| 2,299,155 | 10/1942 | Lange | 137/65 |
| 2,575,086 | 11/1951 | Atchison | 137/468 |
| 2,584,420 | 2/1952 | Branson | 137/607 |
| 3,910,303 | 10/1975 | Rydberg | 137/112 |

*Primary Examiner*—William R. Cline
*Assistant Examiner*—H. Jay Spiegel

[57] ABSTRACT

A hot fluid is directed through a valved conduit inlet. Downstream of the inlet, the conduit divides into a pair of outlets through which the hot fluid flows. The flow through the outlets is controlled by a pair of vertically oriented valves linked together by a V-shaped linkage and weight biased toward the closed position such that when one valve is open the other is closed, and vice versa. The valve actuation means comprises a permanent magnet mounted on the housing in close proximity to each valve; each valve has mounted thereon and exposed to the hot fluid a magnetic material. Thus, when the magnetic material on the open valve is heated above its Curie temperature, the material loses its attraction for the permanent magnet and the weight bias closes that valve and simultaneously moves the other valve close enough to the permanent magnet to be held open thereby. When that valve's magnetic material is heated above the Curie temperature it in turn closes and the other valve opens. Thus, as long as fluid heated to a temperature above the Curie temperature of the magnetic valve material is flowing through the device, continuous oscillation of the valves occurs.

5 Claims, 2 Drawing Figures

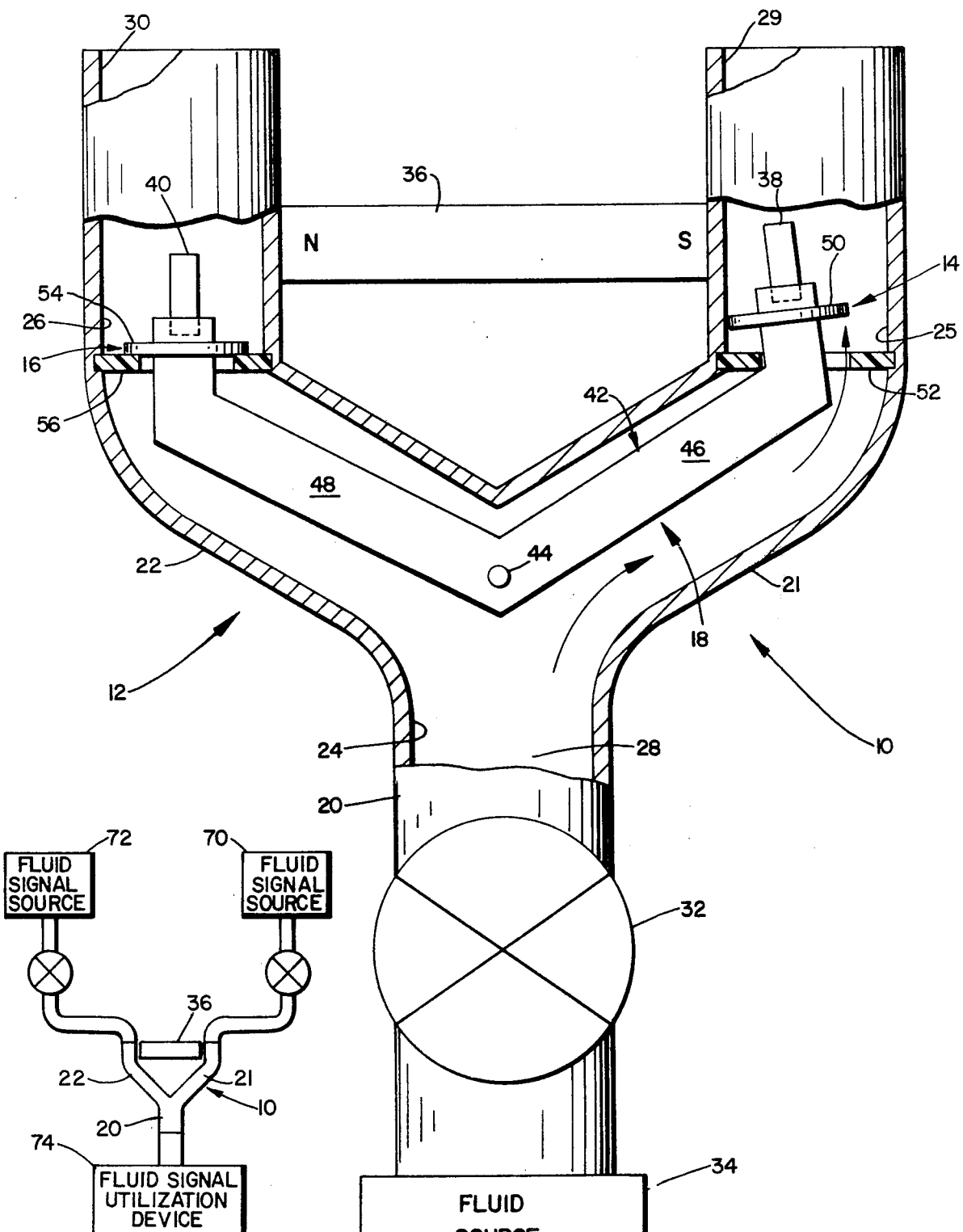

THERMOMAGNETIC VALVE

FIELD OF INVENTION

This invention relates to valves and is particularly concerned with a novel thermomagnetic valve which utilizes the Curie temperature property of magnetic materials.

BACKGROUND

As is well known, a metallic or non-metallic magnetic material loses its magnetic properties upon being heated to a temperature above its Curie temperature and regains its magnetic properties upon being cooled to a temperature below its Curie temperature. Various devices have heretofore been proposed which utilize this phenomenon. Examples of such devices are described in United States Letters Patent No. 3,149,246 issued to W. P. Mason on Sept. 15, 1964, United States Letters Patent No. 3,445,740 issued on May 20, 1969 to G. G. Merkl and United States Letters Patent No. 3,743,866 issued on July 3, 1973 to A. Pire.

SUMMARY AND OBJECTS OF INVENTION

A major object of this invention resides in the provision of a novel thermomagnetically controlled valve which utilizes the Curie temperature phenomenon mentioned above.

In the preferred embodiment, the valve unit of this invention comprises a pair of valves, the first of which controls flow of fluid between first and second operating ports or passages, and the second of which controls flow of fluid between the above-mentioned first operating port and a third operating port or passage. According to this invention, a thermomagnetic actuator for operating the two valves mentioned above comprises an actuator member which is common to the two valves and first and second magnetic members adapted to cooperate with a permanent magnet for displacing the actuator member between two operating positions. In one operating position, the actuator member opens the first valve and closes the second valve and in its other operating position, the actuator member closes the first valve and opens the second valve.

The magnetic members are each mounted on or otherwise operatively connected to the actuator member in such a manner that when one magnetic member is attracted to the magnet, it displaces the actuator to one of its operating positions and when the other magnetic member is attracted to the magnet, it shifts the actuator member to the other of its operating positions.

Thus by alternately heating the two magnetic members to temperatures above their Curie temperatures, the actuator member is flipped back and forth between its two operating positions to thereby alternately open the two valves mentioned above.

In the preferred embodiment the two magnetic members are so positioned that they are subject to the temperature of fluid at the second and third operating ports respectively. By selecting the Curie temperatures of the magnetic members to be less than the temperature of the fluid, the fluid is caused to flow alternately and cyclically through the second and third operating ports from a source connected to the first operating port.

With the foregoing in mind, another important object of this invention is to provide a novel valve unit which utilizes the Curie temperature phenomenon to thermagnetically control operation of a valve.

Another object of this invention is to provide a novel flip-flop type valve unit in which a thermomagnetic device alternately establishes first and second magnetic couplings to cyclically displace a valve actuator to two different operating positions, and in which the valve actuator is effective to open a first valve when in one of its operating positions and to open a second valve when in its other operating position.

Still another object of this invention is to provide a novel thermomagnetic valve unit in which a magnetic member is positioned on the downstream side of a valve so that it will be heated to a temperature above its Curie temperature by heated fluid when the valve is opened, in which the magnetic member is attracted to a magnet when its temperature is below its Curie temperature, in which an actuator is positioned by the magnetic member when the latter is coupled to the magnet to open the valve, and in which the magnetic member de-couples from the magnet upon being heated by the fluid to enable the actuator to close the valve.

A further object of this invention is to provide a novel logic gate which is thermomagnetically operated for employment in a hydraulic or fluid circuit.

Further objects of this invention will appear as the description proceeds in conjunction with the appended claims and the below described drawings.

DESCRIPTION OF THE DRAWINGS

FIG. 1 is a partially sectioned, partially schematic plan view of a valve unit incorporating the principles of this invention; and FIG. 2 is a schematic diagram of a fluid circuit incorporating the valve unit of this invention as a logic gate.

DETAILED DESCRIPTION

Referring to FIG. 1, a thermally responsive flip-flop type valve unit 10 incorporating the principles of this invention is shown to comprise a housing 12, a pair of valves 14 and 16, and a thermomagnetic actuator assembly 18 for valves 14 and 16.

Housing 12 may be formed by conduit sections 20, 21 and 22 which respectively define fluid flow passages 24, 25 and 26. Passages 24, 25 and 26 may respectively terminate in operating ports 28, 29 and 30 as shown. Passage 24 is common to and in fluid communication with passages 25 and 26.

Valve 14 is arranged in conduit section 21 to control flow of fluid between operating ports 28 and 29. Valve 16 is arranged in conduit section 22 to control flow of fluid between operating ports 28 and 30.

In FIG. 1, conduit section 20 is connected through a suitable valve 32 to a source of heated fluid which is indicated at 34. With this arrangement, therefore, port 28 is an inlet port and ports 29 and 30 are outlet ports. When valve 32 is opened, fluid from source 34 will flow into the valve unit through passage 24. From passage 24, the fluid flows out of the valve unit through either passage 25 or passage 26 depending upon which of the two valves 14 and 16 is opened.

In accordance with this invention, actuator assembly 18 comprises a permanent magnet 36, a pair of magnetic bars or members 38 and 40 and a valve-actuating rocker member 42. Rocker member 42 is pivotally mounted in housing 10 by a pin 44 at the juncture of conduit section 20 with conduit sections 21 and 22. Rocker member 42 has a pair of arms 46 and 48 extending in opposite directions from pivot pin 44 into conduit sections 21 and 22 respectively. Rocker 42 is preferably symmetrical about the axis of pin 44 as shown.

Valve 14 comprises a valve closure member 50 and an annular valve seat 52. Valve 16 is preferably of the same construction as valve 14 and comprises a valve closure member 54 and an annular valve seat 56. Seats 52 and 56, which may be rigid, are positioned and fixed in conduit sections 21 and 22 respectively.

Closure member 50 is mounted on and fixed to arm 46 near the free end of the rocker arm in conduit section 21. Similarly, closure member 54 is mounted on and fixed to arm 48 near the free end thereof in conduit section 22.

In this embodiment, each of the valve closure members 50 and 54 is in the form of a washer or similar annular member and may be formed from rubber or plastics material with sufficient deformability to interfittingly and snugly seat tightly against its associated valve seat. Rocker arm 46 extends freely through the fluid flow port or passage defined by valve seat 52 such that valve member 50 is on the downstream side of seat 52 as shown. Likewise, rocker arm 48 extends freely through the fluid flow passage or port defined by valve seat 56 such that closure member 54 is on the downstream side of seat 56.

From the foregoing construction it is clear than when rocker member 42 is rocked counterclockwise about the axis of pivot pin 44, closure member 50 lifts off seat 52 to allow fluid to pass through and beyond seat 52, and closure member 54 seats on seat 56 to establish a hermetic seal with seat 56 which blocks flow of fluid past the valve seat. When rocker member 42 is rocked clockwise about the axis of pivot pin 44, valve closure member 54 lifts off seat 56 to permit fluid to flow through seat 56, and valve closure member 50 seats on seat 52 to establish a hermetic seal with seat 52 which blocks fluid flow past the valve seat. Clockwise displacement of rocker member 42 is limited by seating engagement with seat 52, and counterclockwise displacement of rocker member 42 is limited by seating engagement with seat 56.

From the foregoing it will be appreciated that pivotal displacement of rocker member 42 to its extreme counterclockwise position blocks flow of fluid through passage 26 and permits flow of fluid through passage 25. Pivotal displacement of rocker member 42 to its extreme clockwise position, on the other hand blocks flow of fluid through passage 25, but permits flow of fluid through passage 26.

The axis about which rocker member 42 is pivotal about pivot 56 is normal to fluid flow paths entering passages 25 and 26 upstream from valve seats 52 and 56. Pivot 44 is positioned upstream from seats 52 and 56.

As shown, the magnetic member 38 is fixed in a socket which is formed at the free end of rocker arm 46 in passage 25. Similarly, the magnetic member 40 is fixed in a socket which is formed at the free end of rocker arm 48 in passage 26. Members 38 and 40 are adapted to be alternately attracted to magnet 36 as will be described in detail shortly.

In this embodiment, magnet 36 is suitably mounted between conduits sections 21 and 22 as shown. The arrangement and positioning of magnet 36 and members 38 and 40 is such that members 38 and 40 will be in the magnetic field developed by magnet 36 and hence are attractable to magnet 36. As shown, the poles of magnet 36 are positioned closely in the region of members 38 and 40.

The metal or other material employed for making members 38 and 40 has a pre-selected Curie temperature. Thus, upon heating each of the members 38 and 40 to a temperature above its Curie point, it loses its magnetic properties and can no longer be attracted by magnet 52 as is well known. When each magnetic member is allowed to cool to a temperature below its Curie temperature, it regains its magnetic properties. Any suitable metal alloy having a desired Curie temperature may be selected to form members 38 and 40. For example, a suitable Nickel iron alloy may be employed. Alternatively, member 38 and 40 may be made fro Gadolinium. The Curie temperature selected is dependent upon various factors such as the temperature of the fluid to be conveyed by valve unit 10 and the duration of flow of the fluid which is desired through each of the passages 25 and 26. Both of the members 38 and 40 may be made from the same metal or metal alloy so that they both have the same Curie temperature. The Curie temperatures for members 38 and 40 is selected to be somewhat less than the temperature of the fluid conveyed from source 34.

As shown, member 38 is positioned in passage 25 on the downstream side of valve seat 52 so that it is in the path of and is heated by fluid entering through passage 24 and passing through seat 52 when closure member 50 is in its open position where it lifted off seat 52. Likewise, member 40 is positioned in passage 26 on the downstream side of valve seat 56 so that it is in the path of and is heated by fluid entering passage 24 and passing through valve seat 56 when closure member 54 is in its open position where it lifted off valve seat 56.

Thus, when rocker member 42 is rocked to its illustrated extreme counterclockwise position to open the fluid flow port through valve seat 52 and to close the fluid flow port through valve seat 56, member 38 will be heated by the fluid flowing through passage 25 while member 40 is allowed to cool to a temperature below that of its Curie temperature since flow of fluid through passage 26 is blocked. When rocker member 42 is rocked to its extreme clockwise position to open the fluid flow port through valve seat 56 and to close the fluid flow port through valve seat 52, member 40 will be heated by the fluid flowing through passage 26, while member 38 is allowed to cool to a temperature below that of its Curie temperature.

In operation of valve unit 10, assume that rocker member 42 is in its illustrated extreme counterclockwise position. Before heating fluid from source 34 is supplied to passage 24 by way of valve 32, members 38 and 40 will be relatively cool and at a temperature below their common Curie temperature. Member 38 will therefore be attracted by magnet 36 to hold rocker member 42 in its illustrated position. When the fluid is supplied to passage 24 from source 34, it will therefore flow through valve seat 52, but not through valve seat 56. Member 38 will therefore begin to heat while member 40 remains relatively cool and below its Curie temperature. As the fluid continues to flow past member 38 in passage 25, member 38 heats up, and after a pre-selected or predetermined time period, the temperature of member 38 will rise to a level which is above its Curie temperature. At this time, member 38 loses its magnetic properties and therefore can no longer be attracted by magnet 36.

The assembly of rocker member 42, closure members 50 and 54 and members 38 and 40 is balanced in such a manner that in absence of the magnetic influence of magnet 36, rocker member 42 will assume a position about midway between its extreme clockwise and counterclockwise positions. Thus when member 38 is heated by the heating fluid to a temperature above its Curie temperature, the resulting removal of the magnetic coupling with member 38 enables rocker member 42 to pivot clockwise to move member 40 toward a pole of magnet 36 and hence into the denser region of the magnet's magnetic field.

As a result, magnet 36 attracts member 40 to continue the clockwise displacement of rocker member 42 to its extreme clockwise position where the fluid flow port through valve seat 56 is opened and the fluid flow port through valve seat 52 is closed. The fluid will consequently be diverted to flow through passage 26 to heat member 40. Additionally, flow of heating fluid through passage 25 will be blocked with the result that member 38 will begin to cool.

After a pre-selected or predetermined time period, the temperature of member 40 will be raised by the fluid to a level above its Curie temperature, and member 40 will therefore lose its magnetic properties so that it will no longer be attracted by magnet 36. By this time, member 38 will have cooled sufficiently so that its temperature will be below its Curie temperature to regain its magnetic properties.

Rocker member 42 will therefore rock counterclockwise to move member 38 closer to a pole of magnet 36, while moving member 40 away from the permanent magnet. Member 38 therefore is attracted by magnet 36 to rock member 42 to its extreme counterclockwise position where the fluid flow port through valve seat 56 is closed and the fluid flow port through valve seat 52 is open. Therefor, the fluid will again be diverted to flow through passage 25. Now, member 40 is allowed to cool while member 38 is being heated by the heating fluid flowing through passage 25 to repeat the switching operation described above. Thus, valve unit 10 cyclically and alternately directs the fluid through passages 25 and 26 for pre-selected time intervals. If the Curie temperatures are the same, fluid will alternately flow through passages 25 and 26 for equal time intervals and hence at a constant repetition rate.

The motivating or actuating fluid at source 34 may be a liquid or a gas. Alternatively, a heating medium other than the fluid supplied from source 34 could be employed to alternately heat members 38 and 40.

Valve unit 10 may be employed wherever it is desired to cause a fluid to flow alternately through two different conduits at a pre-selected repetition rate. For example, it may be desired to alternately heat two devices or two bodies of liquid or gases with the fluid supplied through passages 25 and 26.

The valve unit of this invention may also be employed in a hydraulic or fluid logic circuit to accomplish, for example, automatic counting or other automatic functions. In this respect, the valve unit of this invention is capable of performing binary decisions, and it can be employed as an oscillator when a continuous supply of motivating gas or liquid is supplied to inlet port 28.

The valve unit of this invention can also be employed as a bistable device under conditions where only a pulse of motivating fluid is supplied to the inlet port shown in FIG. 1.

On the other hand, continuous flow of heated motivating fluid into passage 28 causes the valve unit of FIG. 1 to operate a monostable device.

Additionally, the valve unit of this invention may be employed as a logic gate in a hydraulic or fluid circuit. For example, it may be employed as an exclusive or gate by feeding pulses of motivating fluid to either port 29 and/or port 30 from fluid circuit sources 70 and 72, respectively. A pulse of motivating fluid from either of these sources results in passage of the fluid through port 28 to a fluid signal utilization device 74.

Finally, the valve unit of this invention can readily be converted to a special, monostable device by replacing one of the magnetic members 38 and 40 with a spring (not shown) which is arranged to normally bias rocker member 42 to a pre-selected one of its two operating positions (i.e., its extreme counterclockwise position or its extreme clockwise position). With such an arrangement, rocker member 42 is biased to one of its two operating positions by the spring, and the unremoved one of the two magnetic members 38 and 40 causes displacement of rocker member 42 to its other operating position upon being attracted to magnet 36.

Magnet 36 is held stationary or fixed in place by any suitable means such as an unshown bracket which may be secured to housing 12.

What is claimed and desired to be secured by Letters Patent is:

1. A fluid flow valve unit comprising a structure having a fluid inlet passage adapted to be connected to a source of fluid and first and second fluid outlet passages in fluid communication with said inlet passage, first valve means disposed in said first fluid outlet passage for controlling flow of fluid through said first outlet passage, second valve means disposed in said second outlet passage for controlling flow of fluid through said second outlet passage, a valve actuator for operating said first and second valve means, said actuator being displaceable to a first operating position to open said first valve means and close said second valve means, and said actuator being further displaceable to a second operating position to open said second valve means and close said first valve means, and means controlling the displacement of said actuator comprising first and second magnetic means and a magnet, said first and second magnetic means being positioned on said actuator in the magnetic field developed by said magnet, each of said first and second magnetic means having a pre-selected Curie temperature which is less than the temperature of said fluid, said first magnetic means being disposed in said first outlet passage downstream from said first valve means to be heated by said fluid to a temperature above its Curie temperature when said first valve means is opened, and said second magnetic means being disposed in said second outlet passage downstream from said second valve means to be heated by said fluid to a temperature above its Curie temperature when said second valve means is open, said first magnetic means being attracted to said magnet when its temperature is below its Curie temperature to displace said actuator to said first operating position, and said second magnetic means being attracted to said magnet when its temperature is below its Curie temperature to displace said actuator to said second operating position.

2. The fluid flow valve unit defined in claim 1 comprising means mounting said actuator for pivotal displacement between said first and second operating positions.

3. The fluid flow valve unit defined in claim 2 wherein said actuator has first and second arms respectively extending into said first and second outlet passages.

4. The fluid flow valve unit defined in claim 3 wherein said first valve means comprises a valve seat and a valve closure member mounted on said first arm to seat on said seat upon displacement of said actuator to said second operating position, and wherein said second valve means comprises a valve seat and a valve closure member mounted on said second arm to seat on the seat of said second valve means upon displacement of said actuator to said first operating position.

5. In a fluid flow valve unit having a fluid inlet port and a fluid outlet port, passage means providing fluid communication between said inlet and outlet ports, a valve seat disposed in said passage means between said inlet and outlet ports, a valve actuator mounted for displacement between first and second operating positions, valve closure means secured to said actuator to seat on said seat and block flow of fluid through said passage means when said actuator is displaced to its first operating position and to move away from said seat to allow flow of fluid through said passage means when said actuator is displaced to its second operating position, a magnet, magnetic means disposed in said passage means to be subject to the temperature of fluid in said passage means and having a pre-selected Curie temperature which is less than the temperature of the fluid supplied to said inlet port, said magnetic means being disposed in the magnetic field developed by said magnet to be attracted thereto when its temperature is below its Curie temperature, and said magnetic means being secured to said actuator to displace said actuator to said second operating position upon being attracted by said magnet, and means effective to cause displacement of said actuator to its first position when said magnetic means is heated by the fluid to a temperature above its Curie temperature.

* * * * *